United States Patent
Vishwanath et al.

(10) Patent No.: US 12,411,681 B2
(45) Date of Patent: Sep. 9, 2025

(54) SYSTEMS AND METHODS FOR SUPPORTING REBOOTLESS FIRMWARE UPDATES

(71) Applicant: Dell Products, L.P., Round Rock, TX (US)

(72) Inventors: Manjunath Vishwanath, Bangalore (IN); Rama Rao Bisa, Bangalore (IN); Pavan Kumar Gavvala, Bangalore (IN); Manjunath Am, Bangalore (IN); Shantanu Kumar Pradhan, Bangalore (IN); Chandrasekhar R, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 30 days.

(21) Appl. No.: 17/935,589

(22) Filed: Sep. 27, 2022

(65) Prior Publication Data

US 2024/0103849 A1 Mar. 28, 2024

(51) Int. Cl.
*G06F 8/656* (2018.01)
(52) U.S. Cl.
CPC .................................. *G06F 8/656* (2018.02)
(58) Field of Classification Search
CPC ........................................................ G06F 8/656
USPC ........................................................ 717/170
See application file for complete search history.

(56) References Cited

U.S. PATENT DOCUMENTS

| | | | | |
|---|---|---|---|---|
| 10,437,581 B1* | 10/2019 | Patil | | G06F 8/71 |
| 10,776,286 B1* | 9/2020 | Kulchytskyy | | G06F 8/65 |
| 10,996,942 B1* | 5/2021 | Bisa | | G06F 9/4812 |
| 2006/0174242 A1* | 8/2006 | Zhu | | G06F 8/65 717/172 |
| 2011/0099544 A1* | 4/2011 | Haramiishi | | G06F 8/654 717/168 |
| 2013/0145141 A1* | 6/2013 | Han | | G06F 9/4401 713/2 |
| 2017/0147322 A1* | 5/2017 | Vopni | | G06F 8/654 |
| 2020/0218545 A1* | 7/2020 | Ganesan | | G06F 9/4411 |
| 2021/0124828 A1* | 4/2021 | Jarnik | | G06F 21/54 |
| 2021/0141646 A1* | 5/2021 | Amin | | G06F 9/4416 |
| 2021/0397436 A1* | 12/2021 | Le | | G06F 9/4411 |

* cited by examiner

*Primary Examiner* — Bradford F Wheaton
(74) *Attorney, Agent, or Firm* — Fogarty LLP

(57) ABSTRACT

Embodiments of systems and methods to provide a firmware update to devices configured in a redundant configuration in an Information Handling System (IHS) are disclosed. In an illustrative, non-limiting embodiment, an IHS may include computer-executable instructions to receive a firmware update image associated with the firmware device, determine that the firmware update image possesses a critical sub-image portion, and schedule a firmware update to be performed in the future on the firmware device using the one firmware update image. The firmware update image conforms to a Platform Level Data Model (PLDM) protocol that is configured to perform rebootless firmware updates.

17 Claims, 7 Drawing Sheets

400

| | VARIABLE (CRITICAL COMPONENT DATA) | |
|---|---|---|
| ULNT16 | COMPONENT ID (1-SYSTEM LIBRARIES, 2-KERNEL, 3-U-BOOT, 4-SECURITY STACK (OPEN SSL AND ETC), ETC) | |
| ULNT16 | COMPONENT TYPE (0-UNKNOWN 1-CRITICAL 2-NON-CRITICAL) | 406 |
| BYTE1-32 | COMPONENT VERSION | |
| BYTE1-32 | COMPONENT LABEL<br>COMPONENT NAME | |
| ....N | THE COMPONENT ID, COMPONENT TYPE, COMPONENT VERSION AND COMPONENT LABEL SHALL BE REPEATED FOR EVERY NEXT CRITICAL COMPONENT DATA | |

| TYPE | REQUEST DATA | |
|---|---|---|
| ULNT32 | REQUEST COUNT<br>THE MAXIMUM NUMBER OF CRITICAL COMPONENTS DATA REQUESTED TO BE RETURNED IN THE RESPONSE TO THIS INSTANCE | |
| ULNT8 | TRANSFER OPERATIONAL FLAG<br>THE OPERATION FLAG INDICATES WHETHER THIS IS THE START OF A NEW TRANSFER OR THE CONTINUATION OF A MULTIPART TRANSFER OF AN ENTRY<br>VALUE: { GETNEXTPART = 0x00, GETFIRSTPART = 0x01} | 402 |
| ULNT32 | DATA TRANSFER HANDLE; 0x00 FOR FIRST TRANSACTION<br>INDICATES WHETHER THIS REQUEST IS FOR THE FIRST PORTION OF THE PDR | |
| TYPE | RESPONSE DATA | |
| ENUM8 | COMPLETION CODE<br>VALUE : {PLDM BASE CODES } | |
| ULNT8 | TRANSFER FLAG<br>INDICATES WHAT PORTION OF THE LICENSE FILES IS BEING TRANSFERRED<br>VALUE: {START = 0x00, MIDDLE = 0x01, END = 0x04, STARTANDEND = 0x05} | |
| ULNT32 | NEXT DATA TRANSFERHANDLE<br>A HANDLE THAT IDENTIFIES THE NEXT PORTION OF THE CRITICAL COMPONENTS DATA TO BE TRANSFERRED, IF ANY PORTIONS ARE REMAINING | 404 |
| ULNT32 | RESPONSE COUNT<br>THE NUMBER OF RECORD DATA BYTES RETURNED IN THIS RESPONSE | |
| ULNT32 | COUNT<br>CRITICAL COMPONENTS COUNT | |
| VARIABLE | CRITICAL COMPONENTS DATA | |

FIG. 4

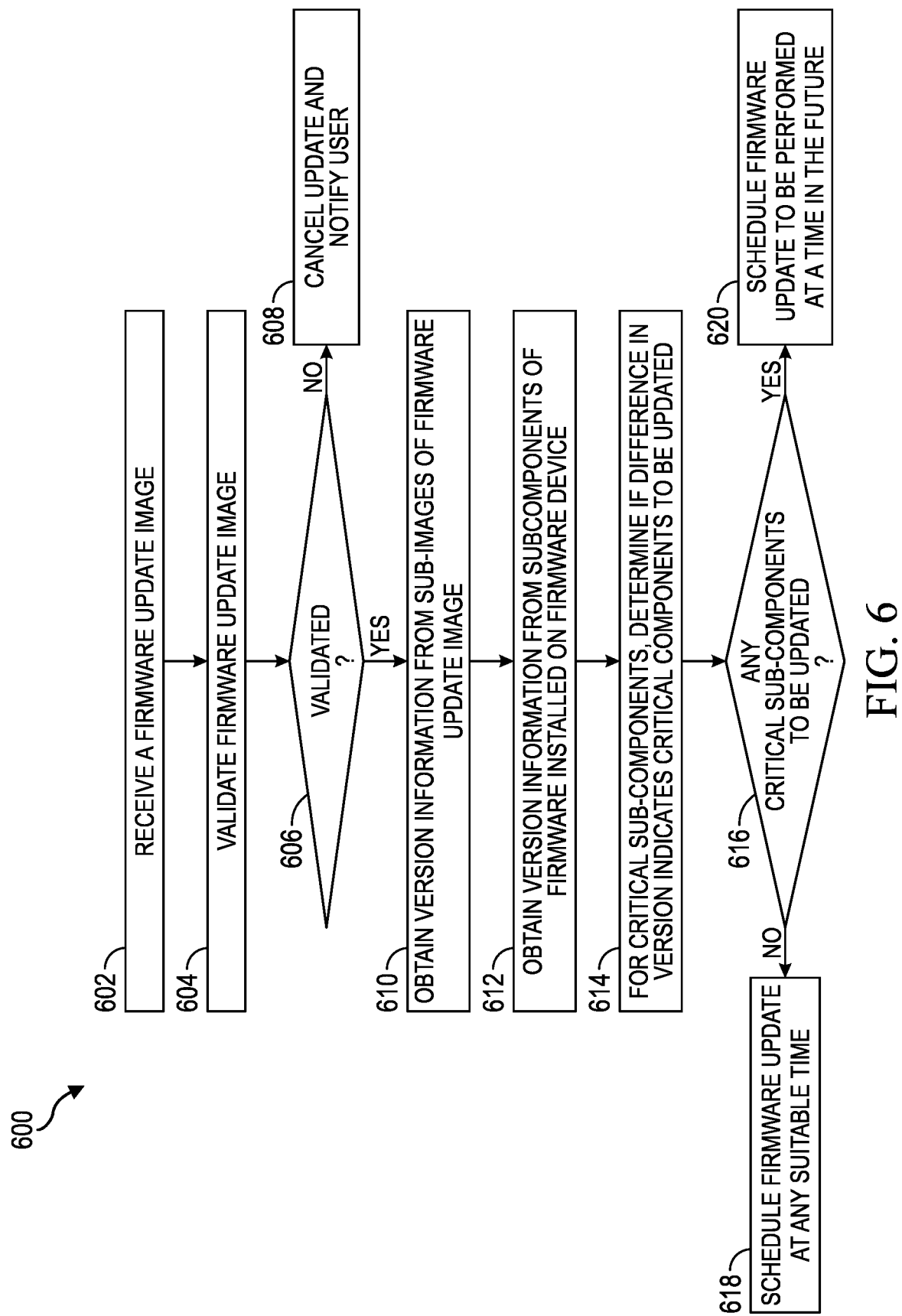

SYSTEMS AND METHODS FOR SUPPORTING REBOOTLESS FIRMWARE UPDATES

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Various hardware components of an IHS may operate using firmware instructions. From time to time, it is expected that firmware utilized by hardware components of an IHS may be updated. Such firmware updates may be made in order to modify the capabilities of a particular hardware component, such as to address security vulnerabilities or to adapt the operations of the hardware component to a specific computing task. When firmware updates are made to a hardware component of an IHS, it is preferable that the IHS experience no downtime and with minimal degradation in the performance of the IHS.

Nowadays, software updates are typically made available on one or more download sites as soon as the software provider can produce them. In this manner, software providers can be more responsive to critical flaws, security concerns, and general customer needs. To update software, a customer would query an update site for software updates, and download and install the software update if available. For example, a typical network-based software update procedure may include the steps of issuing a request over a network to a software provider's download site (e.g., update source) for a software update applicable to the client computer. The update source responds to the client computer with the software update requested by the client computer in the update request. After the client computer has received the software update, the client computer installs the received software update.

One benefit of updating software in such a manner is the reduced cost associated with producing and distributing software updates. Additionally, software updates can now be performed more frequently, especially those that address critical issues and security. Still further, a computer user has greater control as to when and which software updates should be installed on the client computer.

SUMMARY

Embodiments of systems and methods to provide a firmware update to devices configured in a redundant configuration in an Information Handling System (IHS) are disclosed. In an illustrative, non-limiting embodiment, an IHS may include computer-executable instructions to receive a firmware update image associated with the firmware device, determine that the firmware update image possesses a critical sub-image portion, and schedule a firmware update to be performed in the future on the firmware device using the one firmware update image. The firmware update image conforms to a Platform Level Data Model (PLDM) protocol that is configured to perform rebootless firmware updates.

According to another embodiment, a rebootless firmware update method includes the steps of receiving a firmware update image associated with the firmware device, the firmware update image conforming to a Platform Level Data Model (PLDM) protocol that is configured to perform rebootless firmware updates, determining that the firmware update image possesses a critical sub-image portion, and scheduling a firmware update to be performed in the future on the firmware device using the one firmware update image.

According to yet another embodiment, a memory storage device is configured with program instructions that, upon execution by an Information Handling System (IHS), cause the IHS to receive a firmware update image associated with the firmware device, the firmware update image conforming to a Platform Level Data Model (PLDM) protocol that is configured to perform rebootless firmware updates, determine that the firmware update image possesses a critical sub-image portion, and schedule a firmware update to be performed in the future on the firmware device using the one firmware update image.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

FIG. 4 illustrates an example the various fields of an OEM command that may be used to query the firmware device for version information for each of its installed sub-components.

FIG. 6 illustrates an example rebootless firmware update method depicting how a firmware device configured in an IHS may be updated according to one embodiment of the present disclosure.

DETAILED DESCRIPTION

Figure 1A:
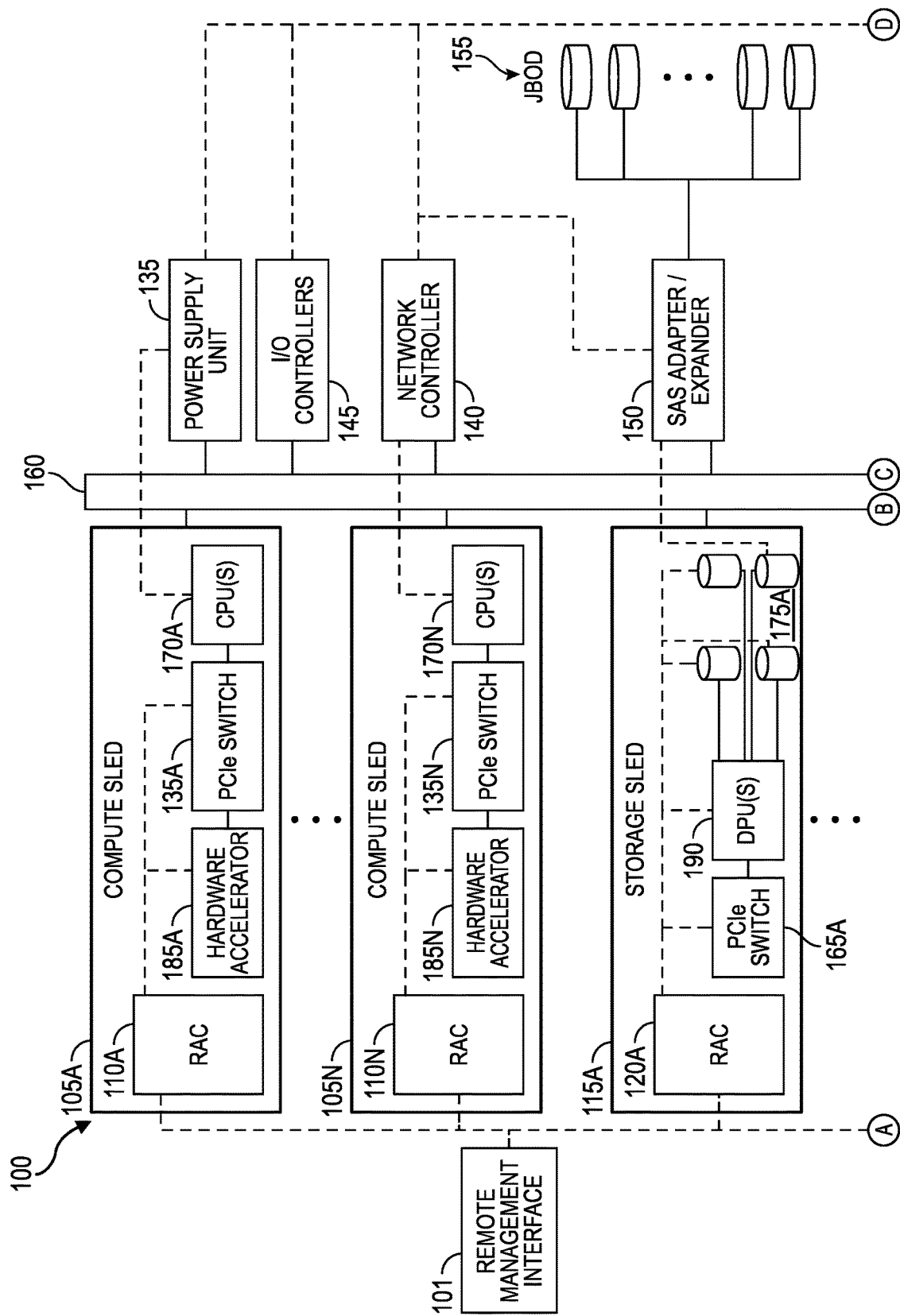
FIGS. 1A and 1B illustrate certain components of a chassis comprising one or more compute sleds and one or more storage sleds that may be configured to implement the systems and methods described according to one embodiment of the present disclosure.

The present disclosure is described with reference to the attached figures. The figures are not drawn to scale, and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

Firmware updates of server components is an important aspect of the life cycle management of an Information Handling System (IHS), (e.g., server, host, etc.). Traditional means of updating IHS devices have involved migrating the workloads running on the host Operating System (OS), creating a reboot job, rebooting the IHS, and performing the firmware update. Additionally, the IHS is again rebooted to activate the new firmware on the IHS components. This process, however, may not be customer friendly as the IHS is often required to be down for the firmware update process, thus impacting business. Because IHSs are forced to reboot to perform the firmware updates, customers often wait for its maintenance cycle (e.g., maintenance window) to update the IHS components, thus missing the new firmware features, security fixes, performance improvements, and the like. As such, rebootless updates may be an important aspect of efficient computer operations. Using rebootless updates, users may be enabled with performing the updates without rebooting the servers and get more useful features above what today's industry specifications can provide.

Customers often upgrade the firmware in the IHSs of a data center for assorted reasons, such as to meet compliance policies, to take advantage of new features, enhancements to the IHS, deploy security fixes, and the like. IHSs that are NVMe-MI/PLDM Specification compliant can take advantage of updating firmware to all IHSs in a system or in a cluster without rebooting the IHSs. Devices that support Platform Level Data Model (PLDM) offer an option for a Remote Access Controller (RAC) to update the firmware without rebooting the IHS. Thus, downtime is often not incurred during the firmware update process. The RAC may be configured to provide out-of-band management facilities for an IHS, even if it is powered off, or powered down to a standby state. The RAC may include a processor, memory, and an out-of-band network interface separate from and physically isolated from an in-band network interface of the IHS, and/or other embedded resources. In certain embodiments, the RAC may include or may be part of a Remote Access Controller (e.g., a DELL Remote Access Controller (DRAC) or an Integrated DRAC (iDRAC)).

The RAC may support rebootless firmware updates for devices, such as non-volatile storage (e.g., hard disks, Solid State Drives (SSDs), etc.), Network Interface Cards (NICs), Graphical Processing Units (GPUs), RACs, Hardware RAID (HWRAID) devices, and the like. With the rebootless feature, when a firmware update image is uploaded using a RAC user interface, all the devices supported by the firmware update image may be automatically selected and updated using rebootless update methods in the real-time without rebooting the IHS. The RAC may implement a Platform Management Components Intercommunication (PMCI) interface stack that is provided by the Distributed Management Task Force (DMTF), and specifies a Management Component Transport Protocol (MCTP) specifying how data travels over certain physical layers, such as the peripheral component interconnect express (PCIe) and I2C/SMBus. Additionally, the PMCI interface stack may further include the Platform Level Data Model (PLDM) protocol that enables information to travel over the MCTP transport layer and can be used for platform management, such as firmware updates.

As mentioned previously, the NVMe-MI and PLDM firmware update specifications provide a way for the RAC to transfer the firmware update images and activate the new firmware update images without the need for a power cycle/server reboot. Though transfer of the firmware update image is often possible without the need for a reboot, it may not necessarily be able to be activated without being rebooted. The firmware device which claims rebootless update capability before the firmware image transfer, can change its capability claims after the firmware update image is completely transferred and verified. Several reasons for such a scenario may include the fact that one or more critical component image portions might have changed in the new firmware update image relative to the existing firmware image on the device and as such, the firmware devices cannot activate the new firmware update image without a power cycle/reboot of the server.

Conventionally, when a firmware update image is uploaded to the RAC, it reads the rebootless/self-contained image activation capability of the firmware device, and schedules a firmware update to be performed immediately if the device claims a rebootless update capability. The user may think they can update the firmware without server reboot given its rebootless update capability claim. But sometimes after the image is transferred, the firmware device may request for reboot of the server, thus potentially mis-informing the user unintentionally, and leading to a bad customer experience.

This problem may be exacerbated by the fact that currently available firmware update images may be up to 40 Mega-bytes in size, and when transferred over an I2C communication link, could consume a relatively large amount of time given that I2C communication links often require approximately 53 minutes to transfer a 100 Kilo-byte image. Other firmware devices using the same I2C communication link could potentially be starved for tens of minutes. Such bottleneck-type behavior could result in causing the fans to spin full speed, and stopping some, most, or all the monitoring and configuration activities during the firmware update. As such, if the firmware device changes its claim on rebootless capability, it could lead to a bad customer experience. With the current industry specifications, the customers cannot be informed when a particular firmware update will need a reboot with a high degree of consistency. Otherwise, such scenarios could lead to bad customer experience and defeat the zero downtime criteria for high availability (HA) based workloads. As will be described in detail herein below, embodiments the present disclosure provide a rebootless firmware update system and method that receives a firmware update image associated with the firmware device, determines whether the firmware update image possesses a critical component update portion, and if so, schedules a firmware update to be performed in the future on the firmware device using the one firmware update image.

Figure 1B:
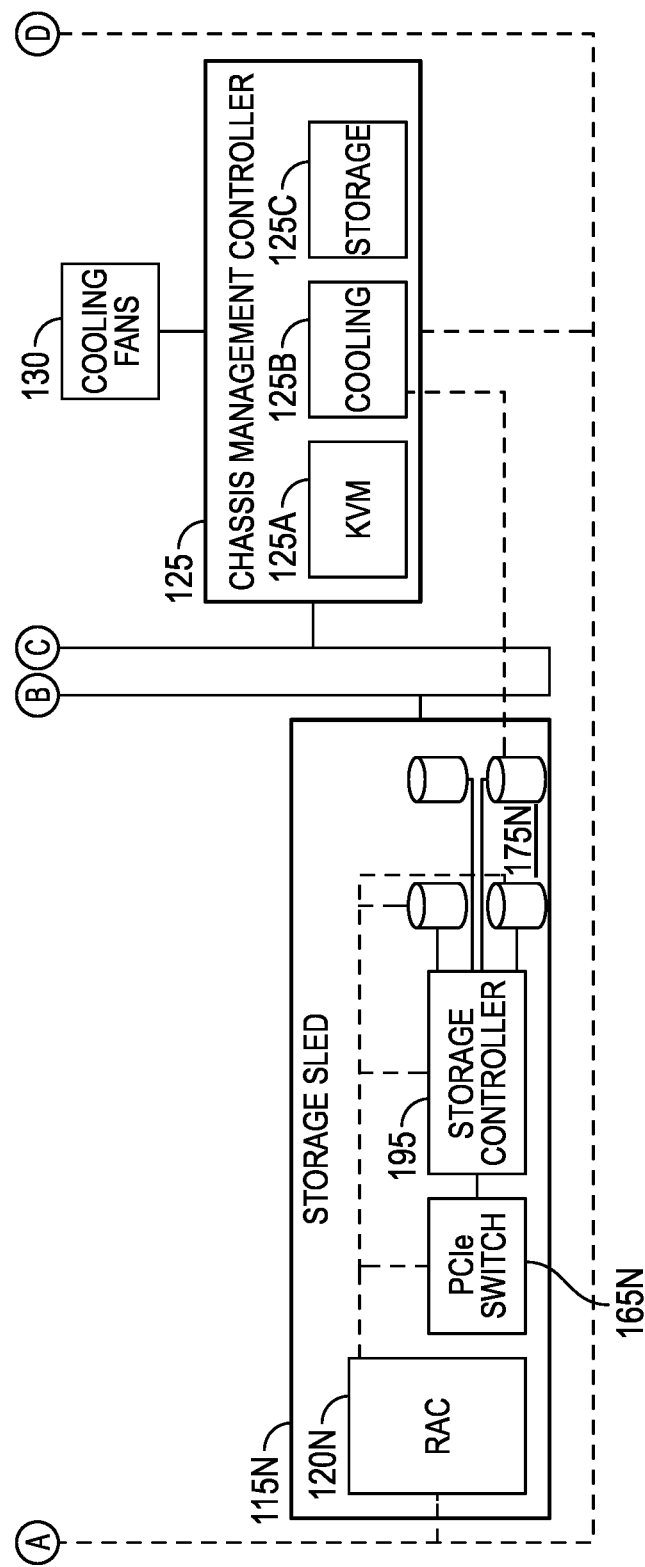

FIGS. 1A and 1B illustrate certain components of a chassis 100 comprising one or more compute sleds 105a-n and one or more storage sleds 115a-n that may be configured to implement the systems and methods described according to one embodiment of the present disclosure. Embodiments of chassis 100 may include a wide variety of hardware configurations in which one or more sleds 105a-n, 115a-n are installed in chassis 100. Such variations in hardware configuration may result from chassis 100 being factory assembled to include components specified by a customer that has contracted for manufacture and delivery of chassis 100. Upon delivery and deployment of a chassis 100, the chassis 100 may be modified by replacing and/or adding various hardware components, in addition to replacement of the removable sleds 105a-n, 115a-n that are installed in the chassis. In addition, once the chassis 100 has been deployed, firmware used by individual hardware components of the sleds 105a-n, 115a-n, or by other hardware components of chassis 100, may be modified in order to update the operations that are supported by these hardware components.

Chassis 100 may include one or more bays that each receive an individual sled (that may be additionally or alternatively referred to as a tray, blade, and/or node), such as compute sleds 105a-n and storage sleds 115a-n. Chassis 100 may support a variety of different numbers (e.g., 4, 8, 16, 32), sizes (e.g., single-width, double-width) and physical configurations of bays. Embodiments may include additional types of sleds that provide various storage, power and/or processing capabilities. For instance, sleds installable in chassis 100 may be dedicated to providing power management or networking functions. Sleds may be individually installed and removed from the chassis 100, thus allowing the computing and storage capabilities of a chassis to be reconfigured by swapping the sleds with diverse types of sleds, in some cases at runtime without disrupting the ongoing operations of the other sleds installed in the chassis 100.

Multiple chassis 100 may be housed within a rack. Data centers may utilize large numbers of racks, with various different types of chassis installed in various configurations of racks. The modular architecture provided by the sleds, chassis and racks allow for certain resources, such as cooling, power and network bandwidth, to be shared by the compute sleds 105a-n and storage sleds 115a-n, thus providing efficiency improvements and supporting greater computational loads. For instance, certain computational tasks, such as computations used in machine learning and other artificial intelligence systems, may utilize computational and/or storage resources that are shared within an IHS, within an individual chassis 100 and/or within a set of IHSs that may be spread across multiple chassis of a data center.

Implementing computing systems that span multiple processing components of chassis 100 is aided by high-speed data links between these processing components, such as PCIe connections that form one or more distinct PCIe switch fabrics that are implemented by PCIe switches 135a-n, 165a-n installed in the sleds 105a-n, 115a-n of the chassis. These high-speed data links may be used to support algorithm implementations that span multiple processing, networking, and storage components of an IHS and/or chassis 100. For instance, computational tasks may be delegated to a specific processing component of an IHS, such as to a hardware accelerator 185a-n that may include one or more programmable processors that operate separate from the main CPUs 170a-n of computing sleds 105a-n. In various embodiments, such hardware accelerators 185a-n may include DPUs (Data Processing Units), GPUs (Graphics Processing Units), SmartNICs (Smart Network Interface Card) and/or FPGAs (Field Programmable Gate Arrays). These hardware accelerators 185a-n operate according to firmware instructions that may be occasionally updated, such as to adapt the capabilities of the respective hardware accelerators 185a-n to specific computing tasks.

Chassis 100 may be installed within a rack structure that provides at least a portion of the cooling utilized by the sleds 105a-n, 115a-n installed in chassis 100. In supporting airflow cooling, a rack may include one or more banks of cooling fans 130 that may be operated to ventilate heated air from within the chassis 100 that is housed within the rack. The chassis 100 may alternatively or additionally include one or more cooling fans 130 that may be similarly operated to ventilate heated air away from sleds 105a-n, 115a-n installed within the chassis. In this manner, a rack and a chassis 100 installed within the rack may utilize various configurations and combinations of cooling fans 130 to cool the sleds 105a-n, 115a-n and other components housed within chassis 100.

The sleds 105a-n, 115a-n may be individually coupled to chassis 100 via connectors that correspond to the bays provided by the chassis 100 and that physically and electrically couple an individual sled to a backplane 160. Chassis backplane 160 may be a printed circuit board that includes electrical traces and connectors that are configured to route signals between the various components of chassis 100 that are connected to the backplane 160 and between different components mounted on the printed circuit board of the backplane 160. In the illustrated embodiment, the connectors for use in coupling sleds 105a-n, 115a-n to backplane 160 include PCIe couplings that support high-speed data links with the sleds 105a-n, 115a-n. In various embodiments, backplane 160 may support diverse types of connections, such as cables, wires, midplanes, connectors, expansion slots, and multiplexers. In certain embodiments, backplane 160 may be a motherboard that includes various electronic components installed thereon. Such components installed on a motherboard backplane 160 may include components that implement all or part of the functions described with regard to the SAS (Serial Attached SCSI) expander 150, I/O controllers 145, network controller 140, chassis management controller 125 and power supply unit 135.

Figure 2:
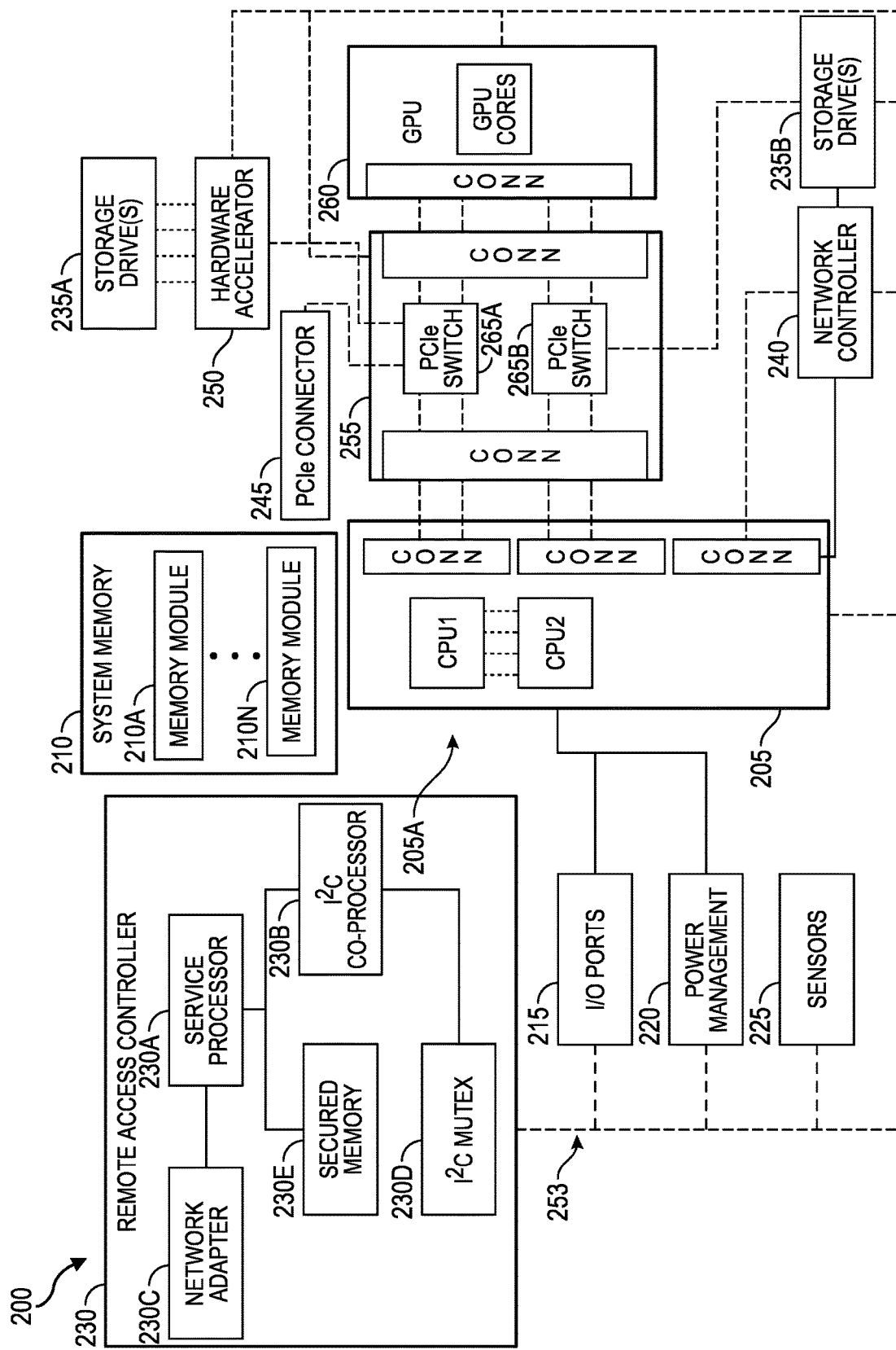
FIG. 2 illustrates an example of an IHS configured to implement systems and methods described herein according to one embodiment of the present disclosure.

In certain embodiments, each individual sled 105a-n, 115a-n may be an IHS such as described with regard to IHS 200 of FIG. 2. Sleds 105a-n, 115a-n may individually or collectively provide computational processing resources that may be used to support a variety of e-commerce, multimedia, business, and scientific computing applications, such as artificial intelligence systems provided via cloud computing implementations. Sleds 105a-n, 115a-n are typically configured with hardware and software that provide leading-edge computational capabilities. Accordingly, services that are provided using such computing capabilities are typically provided as high-availability systems that operate with minimum downtime.

In high-availability computing systems, such as may be implemented using embodiments of chassis 100, any downtime that can be avoided is preferred. As described above, firmware updates are expected in the administration and operation of data centers, but it is preferable to avoid any downtime in making such firmware updates. For instance, in updating the firmware of the individual hardware components of the chassis 100, it is preferable that such updates can be made without having to reboot the chassis. As described in additional detail below, it is also preferable that updates to the firmware of individual hardware components of sleds 105a-n, 115a-n be likewise made without having to reboot the respective sled of the hardware component that is being updated.

As illustrated, each sled 105a-n, 115a-n includes a respective remote access controller (RAC) 110a-n, 120a-n. As described in additional detail with regard to FIG. 2, remote access controller 110a-n, 120a-n provides capabilities for remote monitoring and management of a respective sled 105a-n, 115a-n and/or of chassis 100. In support of these monitoring and management functions, remote access controllers 110a-n may utilize both in-band and sideband (i.e., out-of-band) communications with various managed components of a respective sled 105a-n, 115a-n and chassis 100. Remote access controllers 110a-n, 120a-n may collect diverse types of sensor data, such as collecting temperature sensor readings that are used in support of airflow cooling of the chassis 100 and the sled 105a-n, 115a-n. In addition, each remote access controller 110a-n, 120a-n may implement various monitoring and administrative functions related to a respective sled 105a-n, 115a-n, where these functions may be implemented using sideband bus connections with various internal components of the chassis 100 and of the respective sleds 105a-n, 115a-n. As described in additional detail below, in various embodiments, these capabilities of the remote access controllers 110a-n, 120a-n may be utilized in updating the firmware of hardware components of chassis 100 and/or of hardware components of the sleds 105a-n, 115a-n, without having to reboot the chassis or any of the sleds 105a-n, 115a-n.

The remote access controllers 110a-n, 120a-n that are present in chassis 100 may support secure connections with a remote management interface 101. In some embodiments, remote management interface 101 provides a remote administrator with various capabilities for remotely administering the operation of an IHS, including initiating updates to the firmware used by hardware components installed in the chassis 100. For example, remote management interface 101 may provide capabilities by which an administrator can initiate updates to all of the storage drives 175a-n installed in a chassis 100, or to all of the storage drives 175a-n of a particular model or manufacturer. In some instances, remote management interface 101 may include an inventory of the hardware, software, and firmware of chassis 100 that is being remotely managed through the operation of the remote access controllers 110a-n, 120a-n. The remote management interface 101 may also include various monitoring interfaces for evaluating telemetry data collected by the remote access controllers 110a-n, 120a-n. In some embodiments, remote management interface 101 may communicate with remote access controllers 110a-n, 120a-n via a protocol such the Redfish remote management interface.

In the illustrated embodiment, chassis 100 includes one or more compute sleds 105a-n that are coupled to the backplane 160 and installed within one or more bays or slots of chassis 100. Each of the individual compute sleds 105a-n may be an IHS, such as described with regard to FIG. 2. Each of the individual compute sleds 105a-n may include various different numbers and types of processors that may be adapted to performing specific computing tasks. In the illustrated embodiment, each of the compute sleds 105a-n includes a PCIe switch 135a-n that provides access to a hardware accelerator 185a-n, such as the described DPUs, GPUs, Smart NICs and FPGAs, which may be programmed and adapted for specific computing tasks, such as to support machine learning or other artificial intelligence systems. As described in additional detail below, compute sleds 105a-n may include a variety of hardware components, such as hardware accelerator 185a-n and PCIe switches 135a-n, that operate using firmware that may be occasionally updated.

As illustrated, chassis 100 includes one or more storage sleds 115a-n that are coupled to the backplane 160 and installed within one or more bays of chassis 100 in a similar manner to compute sleds 105a-n. Each of the individual storage sleds 115a-n may include various different numbers and types of storage devices. As described in additional detail with regard to FIG. 2, a storage sled 115a-n may be an IHS 200 that includes multiple solid-state drives (SSDs) 175a-n, where the individual storage drives 175a-n may be accessed through a PCIe switch 165a-n of the respective storage sled 115a-n.

As illustrated, a storage sled 115a may include one or more DPUs (Data Processing Units) 190 that provide access to and manage the operations of the storage drives 175a of the storage sled 115a. Use of a DPU 190 in this manner provides low-latency and high-bandwidth access to numerous SSDs 175a. These SSDs 175a may be utilized in parallel through NVMe transmissions that are supported by the PCIe switch 165a that connects the SSDs 175a to the DPU 190. In some instances, PCIe switch 165a may be an integrated component of a DPU 190. The immense data storage and retrieval capabilities provided by such storage sled 115a implementations may be harnessed by offloading storage operations directed as storage drives 175a to a DPU 190, and thus without relying on the main CPU of the storage sled, or of any other component of chassis 100. As indicated in FIG. 1, chassis 100 may also include one or more storage sleds 115n that provide access to storage drives 175n via a storage controller 195. In some embodiments, storage controller 195 may provide support for RAID (Redundant Array of Independent Disks) configurations of logical and physical storage drives, such as storage drives provided by storage sled 115n. In some embodiments, storage controller 195 may be a HBA (Host Bus Adapter) that provides more limited capabilities in accessing storage drives 175n.

In addition to the data storage capabilities provided by storage sleds 115a-n, chassis 100 may provide access to other storage resources that may be installed in chassis 100 and/or may be installed elsewhere within a rack that houses the chassis 100. In certain scenarios, such storage resources (e.g., JBOD 155) may be accessed via a SAS expander 150 that is coupled to the backplane 160 of the chassis 100. The SAS expander 150 may support connections to a number of JBOD (Just a Bunch of Disks) storage resources 155 that, in some instances, may be configured and managed individually and without implementing data redundancy across the various drives. The additional storage resources may also be at various other locations within a datacenter in which chassis 100 is installed.

In light of the various manners in which storage drives 175a-n, 155 may be coupled to chassis 100, a wide variety of different storage topologies may be supported. Through these supported topologies, storage drives 175a-n, 155 may be logically organized into clusters or other groupings that may be collectively tasked and managed. In some instances, a chassis 100 may include numerous storage drives 175a-n, 155 that are identical, or nearly identical, such as arrays of SSDs of the same manufacturer and model. Accordingly, any firmware updates to storage drives 175a-n, 155 requires the updates to be applied within each of these topologies being supported by the chassis 100. Despite the large number of different storage drive topologies that may be supported by an individual chassis 100, the firmware used by each of these storage devices 175a-n, 155 may be occasionally updated. In some instances, firmware updates may be limited to a single storage drive, but in other instances, firmware updates may be initiated for a large number of storage drives, such as for all SSDs installed in chassis 100.

As illustrated, the chassis 100 of FIG. 1 includes a network controller 140 that provides network access to the sleds 105a-n, 115a-n installed within the chassis. Network controller 140 may include various switches, adapters, controllers, and couplings used to connect chassis 100 to a network, either directly or via additional networking components and connections provided via a rack in which chassis 100 is installed. Network controller 140 operates according to firmware instructions that may be occasionally updated.

Chassis 100 may similarly include a power supply unit 135 that provides the components of the chassis with various levels of DC power from an AC power source or from power delivered via a power system provided by a rack within which chassis 100 may be installed. In certain embodiments, power supply unit 135 may be implemented within a sled that may provide chassis 100 with redundant, hot-swappable power supply units. Power supply unit 135 may operate according to firmware instructions that may be occasionally updated.

Chassis 100 may also include various I/O controllers 145 that may support various I/O ports, such as USB ports that may be used to support keyboard and mouse inputs and/or video display capabilities. Each of the I/O controllers 145 may operate according to firmware instructions that may be occasionally updated. Such I/O controllers 145 may be utilized by the chassis management controller 125 to support various KVM (Keyboard, Video and Mouse) 125a capabilities that provide administrators with the ability to interface with the chassis 100. The chassis management controller 125 may also include a storage module 125c that provides capabilities for managing and configuring certain aspects of the storage devices of chassis 100, such as the storage devices provided within storage sleds 115a-n and within the JBOD 155.

In addition to providing support for KVM 125a capabilities for administering chassis 100, chassis management controller 125 may support various additional functions for sharing the infrastructure resources of chassis 100. In some scenarios, chassis management controller 125 may implement tools for managing the power supply unit 135, network controller 140 and airflow cooling fans 130 that are available via the chassis 100. As described, the airflow cooling fans 130 utilized by chassis 100 may include an airflow cooling system that is provided by a rack in which the chassis 100 may be installed and managed by a cooling module 125b of the chassis management controller 125.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

FIG. 2 illustrates an example of an IHS 200 configured to implement systems and methods described herein according to one embodiment of the present disclosure. It should be appreciated that although the embodiments described herein may describe an IHS that is a compute sled or similar computing component that may be deployed within the bays of a chassis, a variety of other types of IHSs, such as laptops and portable devices, may also operate according to embodiments described herein. In the illustrative embodiment of FIG. 2, IHS 200 may be a computing component, such as sled 105a-n or other type of server, such as a 1RU server installed within a 2RU chassis, which is configured to share infrastructure resources provided within a chassis 100.

IHS 200 may utilize one or more system processors 205, that may be referred to as CPUs (central processing units). In some embodiments, CPUs 205 may each include a plurality of processing cores that may be separately delegated with computing tasks. Each of the CPUs 205 may be individually designated as a main processor and as a co-processor, where such designations may be based on delegation of specific types of computational tasks to a CPU 205. In some embodiments, CPUs 205 may each include an integrated memory controller that may be implemented directly within the circuitry of each CPU 205. In some embodiments, a memory controller may be a separate integrated circuit that is located on the same die as the CPU 205. Each memory controller may be configured to manage the transfer of data to and from a system memory 210 of the IHS, in some cases using a high-speed memory bus 205a. The system memory 210 is coupled to CPUs 205 via one or more memory buses 205a that provide the CPUs 205 with high-speed memory used in the execution of computer program instructions by the CPUs 205. Accordingly, system memory 210 may include memory components, such as static RAM (SRAM), dynamic RAM (DRAM), NAND Flash memory, suitable for supporting high-speed memory operations by the CPUs 205. In certain embodiments, system memory 210 may combine persistent non-volatile memory and volatile memory.

In certain embodiments, the system memory 210 may be comprised of multiple removable memory modules. The system memory 210 of the illustrated embodiment includes removable memory modules 210a-n. Each of the removable memory modules 210a-n may correspond to a printed circuit board memory socket that receives a removable memory module 210a-n, such as a DIMM (Dual In-line Memory Module), that can be coupled to the socket and then decoupled from the socket as needed, such as to upgrade memory capabilities or to replace faulty memory modules. Other embodiments of IHS system memory 210 may be configured with memory socket interfaces that correspond to diverse types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 200 may utilize a chipset that may be implemented by integrated circuits that are connected to each CPU 205. All or portions of the chipset may be implemented directly within the integrated circuitry of an individual CPU 205. The chipset may provide the CPU 205 with access to a variety of resources accessible via one or more in-band buses. IHS 200 may also include one or more I/O ports 215 that may be used to couple the IHS 200 directly to other IHSs, storage resources, diagnostic tools, and/or other peripheral components. A variety of additional components may be coupled to CPUs 205 via a variety of in-line buses.

For instance, CPUs 205 may also be coupled to a power management unit 220 that may interface with a power system of the chassis 100 in which IHS 200 may be installed. In addition, CPUs 205 may collect information from one or more sensors 225 via a management bus.

In certain embodiments, IHS 200 may operate using a BIOS (Basic Input/Output System) that may be stored in a non-volatile memory accessible by the CPUs 205. The BIOS may provide an abstraction layer by which the operating system of the IHS 200 interfaces with hardware components of the IHS. Upon powering or restarting IHS 200, CPUs 205 may utilize BIOS instructions to initialize and test hardware components coupled to the IHS, including both components permanently installed as components of the motherboard of IHS 200 and removable components installed within various expansion slots supported by the IHS 200. The BIOS instructions may also load an operating system for execution by CPUs 205. In certain embodiments, IHS 200 may utilize Unified Extensible Firmware Interface (UEFI) in addition to or instead of a BIOS. In certain embodiments, the functions provided by a BIOS may be implemented, in full or in part, by the remote access controller 230.

In some embodiments, IHS 200 may include a TPM (Trusted Platform Module) that may include various registers, such as platform configuration registers, and a secure storage, such as an NVRAM (Non-Volatile Random-Access Memory). The TPM may also include a cryptographic processor that supports various cryptographic capabilities. In IHS embodiments that include a TPM, a pre-boot process implemented by the TPM may utilize its cryptographic capabilities to calculate hash values that are based on software and/or firmware instructions utilized by certain core components of IHS, such as the BIOS and boot loader of IHS 200. These calculated hash values may then be compared against reference hash values that were previously stored in a secure non-volatile memory of the IHS, such as during factory provisioning of IHS 200. In this manner, a TPM may establish a root of trust that includes core components of IHS 200 that are validated as operating using instructions that originate from a trusted source.

As illustrated, CPUs 205 may be coupled to a network controller 240, such as provided by a Network Interface Controller (NIC) card that provides IHS 200 with communications via one or more external networks, such as the Internet, a LAN, or a WAN. In some embodiments, network controller 240 may be a replaceable expansion card or adapter that is coupled to a connector (e.g., PCIe connector of a motherboard, backplane, midplane, etc.) of IHS 200. In some embodiments, network controller 240 may support high-bandwidth network operations by the IHS 200 through a PCIe interface that is supported by the chipset of CPUs 205. Network controller 240 may operate according to firmware instructions that may be occasionally updated.

As indicated in FIG. 2, in some embodiments, CPUs 205 may be coupled to a PCIe card 255 that includes two PCIe switches 265a-b that operate as I/O controllers for PCIe communications, such as TLPs (Transaction Layer Packets), that are transmitted between the CPUs 205 and PCIe devices and systems coupled to IHS 200. Whereas the illustrated embodiment of FIG. 2 includes two CPUs 205 and two PCIe switches 265a-b, different embodiments may operate using different numbers of CPUs and PCIe switches. In addition to serving as I/O controllers that route PCIe traffic, PCIe switches 265a-b include switching logic that can be used to expand the number of PCIe connections that are supported by CPUs 205. PCIe switches 265a-b may multiply the number of PCIe lanes available to CPUs 205, thus allowing more PCIe devices to be connected to CPUs 205, and for the available PCIe bandwidth to be allocated with greater granularity. Each of the PCIe switches 265a-b may operate according to firmware instructions that may be occasionally updated.

Using the available PCIe lanes, the PCIe switches 265a-b may be used to implement a PCIe switch fabric. Also through this switch fabric, PCIe NVMe (Non-Volatile Memory Express) transmission may be supported and utilized in high-speed communications with SSDs, such as storage drives 235a-b, of the IHS 200. Also through this switch fabric, PCIe VDM (Vendor Defined Messaging) may be supported and utilized in managing PCIe-compliant hardware components of the IHS 200, such as in updating the firmware utilized by the hardware components.

As indicated in FIG. 2, IHS 200 may support storage drives 235a-b in various topologies, in the same manner as described with regard to the chassis 100 of FIG. 1. In the illustrated embodiment, storage drives 235a are accessed via a hardware accelerator 250, while storage drives 235b are accessed directly via PCIe switch 265b. In some embodiments, the storage drives 235a-b of IHS 200 may include a combination of both SSD and magnetic disk storage drives. In other embodiments, all of the storage drives 235a-b of IHS 200 may be identical, or nearly identical. In all embodiments, storage drives 235a-b operate according to firmware instructions that may be occasionally updated.

As illustrated, PCIe switch 265a is coupled via a PCIe link to a hardware accelerator 250, such as a DPU, Smart-NIC, GPU and/or FPGA, that may be a connected to the IHS via a removable card or baseboard that couples to a PCIe connector of the IHS 200. In some embodiments, hardware accelerator 250 includes a programmable processor that can be configured for offloading functions from CPUs 205. In some embodiments, hardware accelerator 250 may include a plurality of programmable processing cores and/or hardware accelerators, which may be used to implement functions used to support devices coupled to the IHS 200. In some embodiments, the processing cores of hardware accelerator 250 include ARM (advanced RISC (reduced instruction set computing) machine) processing cores. In other embodiments, the cores of the DPUs may include MIPS (microprocessor without interlocked pipeline stages) cores, RISC-V cores, or CISC (complex instruction set computing) (i.e., x86) cores. Hardware accelerator may operate according to firmware instructions that may be occasionally updated.

In the illustrated embodiment, the programmable capabilities of hardware accelerator 250 implement functions used to support storage drives 235a, such as SSDs. In such storage drive topologies, hardware accelerator 250 may implement processing of PCIe NVMe communications with SSDs 235a, thus supporting high-bandwidth connections with these SSDs. Hardware accelerator 250 may also include one more memory devices used to store program instructions executed by the processing cores and/or used to support the operation of SSDs 235a such as in implementing cache memories and buffers utilized to support high-speed operation of these storage drives, and in some cases may be used to provide high-availability and high-throughput implementations of the read, write and other I/O operations that are supported by these storage drives 235a. In other embodiments, hardware accelerator 250 may implement operations in support of other types of devices and may similarly support high-bandwidth PCIe connections with these devices. For instance, in various embodiments, hardware accelerator 250 may support high-bandwidth connections, such as PCIe connections, with networking devices in implementing functions of a network switch, compression and codec functions, virtualization operations or cryptographic functions.

As illustrated in FIG. 2, PCIe switches 265a-b may also support PCIe couplings with one or more GPUs (Graphics Processing Units) 260. Embodiments may include one or more GPU cards, where each GPU card is coupled to one or more of the PCIe switches 265a-b, and where each GPU card may include one or more GPUs 260. In some embodiments, PCIe switches 265a-b may transfer instructions and data for generating video images by the GPUs 260 to and from CPUs 205. Accordingly, GPUs 260 may include one or more hardware-accelerated processing cores that are optimized for performing streaming calculation of vector data, matrix data and/or other graphics data, thus supporting the rendering of graphics for display on devices coupled either directly or indirectly to IHS 200. In some instances, GPUs may be utilized as programmable computing resources for offloading other functions from CPUs 205, in the same manner as hardware accelerator 250. GPUs 260 may operate according to firmware instructions that may be occasionally updated.

As illustrated in FIG. 2, PCIe switches 265a-b may support PCIe connections in addition to those utilized by GPUs 260 and hardware accelerator 250, where these connections may include PCIe links of one or more lanes. For instance, PCIe connectors 245 supported by a printed circuit board of IHS 200 may allow various other systems and devices to be coupled to IHS. Through couplings to PCIe connectors 245, a variety of data storage devices, graphics processors and network interface cards may be coupled to IHS 200, thus supporting a wide variety of topologies of devices that may be coupled to the IHS 200.

As described, IHS 200 includes a remote access controller 230 that supports remote management of IHS 200 and of various internal components of IHS 200. In certain embodiments, remote access controller 230 may operate from a different power plane from the processors 205 and other components of IHS 200, thus allowing the remote access controller 230 to operate, and manage tasks to proceed, while the processing cores of IHS 200 are powered off. Various functions provided by the BIOS, including launching the operating system of the IHS 200, and/or functions of a TPM may be implemented or supplemented by the remote access controller 230. In some embodiments, the remote access controller 230 may perform various functions to verify the integrity of the IHS 200 and its hardware components prior to initialization of the operating system of IHS 200 (i.e., in a bare-metal state). In some embodiments, certain operations of the remote access controller 230, such as the operations described herein for updating firmware used by managed hardware components of IHS 200, may operate using validated instructions, and thus within the root of trust of IHS 200.

In some embodiments, remote access controller 230 may include a service processor 230a, or specialized microcontroller, which operates management software that supports remote monitoring and administration of IHS 200. The management operations supported by remote access controller 230 may be remotely initiated, updated, and monitored via a remote management interface 101, such as described with regard to FIG. 1. Remote access controller 230 may be installed on the motherboard of IHS 200 or may be coupled to IHS 200 via an expansion slot or other connector provided by the motherboard. In some instances, the management functions of the remote access controller 230 may utilize information collected by various managed sensors 225 located within the IHS. For instance, temperature data collected by sensors 225 may be utilized by the remote access controller 230 in support of closed-loop airflow cooling of the IHS 200. As indicated, remote access controller 230 may include a secured memory 230e for exclusive use by the remote access controller in support of management operations.

In some embodiments, remote access controller 230 may implement monitoring and management operations using MCTP (Management Component Transport Protocol) messages that may be communicated to managed devices 205, 235a-b, 240, 250, 255, 260 via management connections supported by a sideband bus 253. In some embodiments, the remote access controller 230 may additionally or alternatively use MCTP messaging to transmit Vendor Defined Messages (VDMs) via the in-line PCIe switch fabric supported by PCIe switches 265a-b. In some instances, the sideband management connections supported by remote access controller 230 may include PLDM (Platform Level Data Model) management communications with the managed devices 205, 235a-b, 240, 250, 255, 260 of IHS 200.

As illustrated, remote access controller 230 may include a network adapter 230c that provides the remote access controller with network access that is separate from the network controller 240 utilized by other hardware components of the IHS 200. Through secure connections supported by network adapter 230c, remote access controller 230 communicates management information with remote management interface 101. In support of remote monitoring functions, network adapter 230c may support connections between remote access controller 230 and external management tools using wired and/or wireless network connections that operate using a variety of network technologies. As a non-limiting example of a remote access controller, the integrated Dell Remote Access Controller (iDRAC) from Dell® is embedded within Dell servers and provides functionality that helps information technology (IT) administrators deploy, update, monitor, and maintain servers remotely.

Remote access controller 230 supports monitoring and administration of the managed devices of an IHS via a sideband bus 253. For instance, messages utilized in device and/or system management may be transmitted using I2C sideband bus 253 connections that may be individually established with each of the respective managed devices 205, 235a-b, 240, 250, 255, 260 of the IHS 200 through the operation of an I2C multiplexer 230d of the remote access controller. As illustrated in FIG. 2, the managed devices 205, 235a-b, 240, 250, 255, 260 of IHS 200 are coupled to the CPUs 205, either directly or indirectly, via in-line buses that are separate from the I2C sideband bus 253 connections used by the remote access controller 230 for device management.

In certain embodiments, the service processor 230a of remote access controller 230 may rely on an I2C co-processor 230b to implement sideband I2C communications between the remote access controller 230 and the managed hardware components 205, 235a-b, 240, 250, 255, 260 of the IHS 200. The I2C co-processor 230b may be a specialized co-processor or micro-controller that is configured to implement an I2C bus interface used to support communications with managed hardware components 205, 235a-b, 240, 250, 255, 260 of HIS 200. In some embodiments, the I2C co-processor 230b may be an integrated circuit on the same die as the service processor 230a, such as a peripheral system-on-chip feature that may be provided by the service processor 230a. The I2C sideband bus 253 is illustrated as single line in FIG. 2. However, sideband bus 253 may be comprised of multiple signaling pathways, where each may be comprised of a clock line and data line that couple the remote access controller 230 to the I2C endpoints (e.g., managed hardware components 205, 235a-b, 240, 250, 255, 260).

In various embodiments, an IHS 200 does not include each of the components shown in FIG. 2. In various embodiments, an IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 205 as a systems-on-a-chip.

Figure 3:
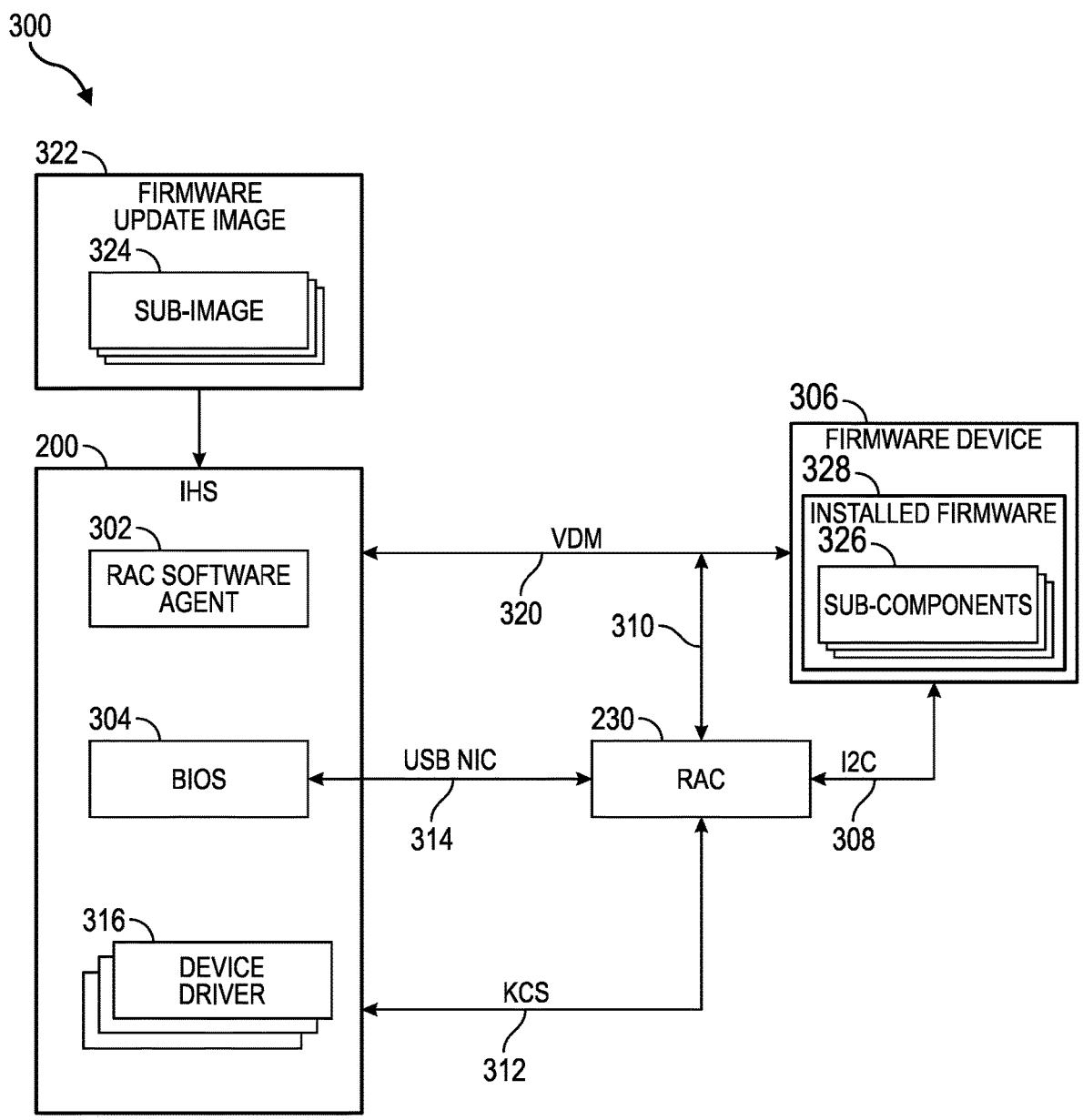
FIG. 3 is a diagram illustrating several components of an IHS showing how those components may communicate with one another for implementing an example rebootless firmware update system according to one embodiment of the present disclosure.

FIG. 3 is a diagram 300 illustrating several components of an IHS 200 showing how those components may communicate with one another for implementing an example rebootless firmware update system 300 according to one embodiment of the present disclosure. The IHS 200 is shown with a RAC software agent 302 and a basic input output system (BIOS) 304, and one or more device drivers 316 that are each associated with one of multiple firmware devices 306. The firmware devices 306 may be any IHS configurable device, such as a graphics processing card, a network interface card, an input/output (I/O) (e.g., USB) expansion port card, a Wi-Fi interface card, a storage controller card, and the like. For example, the firmware devices 306 may be a hardware accelerator 250, a storage drive 235a, an I/O port 215, a network controller 240, such as described herein above with reference to FIG. 2, Some, most, or all firmware devices 306 communicate with the IHS 200 via system bus 320, which in one embodiment, may include a Peripheral Component Interconnect Express (PCIe) bus.

In one embodiment, the RAC 230 is configured to manage firmware updates for the various firmware devices 306 in the IHS 200. The RAC 230 may communicate with each of multiple firmware devices 306 via an i2c connection 308 such as described above to transfer the firmware update image 322 and activate it once transferred. In other embodiments, the RAC 230 may communicate with each of the firmware devices 306 using other communication protocols, such as i3c SENSEWIRE connections, or serial peripheral interface (SPI) based connections. Additionally, the RAC 230 may also communicate with each of the firmware devices 306 through the system bus 320 using a Management Component Transport Protocol (MCTP) PCIe vendor defined message (VDM) channel 310.

The firmware devices 306 may be any type of IHS configurable device that may be updated with new firmware updates at an ongoing basis. For example, the firmware device 306 may include a non-volatile storage unit (e.g., hard disks, Solid State Drives (SSDs), etc.), Network Interface Cards (NICs), Graphical Processing Units (GPUs), RACs, Hardware RAID (HWRAID) devices, and the like. Citing a particular example, the firmware device 306 may include a storage drive 235b, those that are configured on a storage sled 115a-n, and/or storage resources 155 configured in a JBOD, such as described herein above with reference to FIGS. 1 and 2.

The RAC 230 may also communicate with the IHS 200 through the PCIe VDM channel 310, a Keyboard Controller Style (KCS) channel 312, and/or a USB NIC channel 314. The KCS channel 312 is provided as part of an intelligent platform management interface (IPMI) specification. In general, the IPMI specification defines several system interfaces for local access from the RAC software agent 302 and BIOS 304 to the RAC 230 of which the KCS protocol provides an ideal connection that does not require authentication for its operation.

While the RAC 230 may communicate with each firmware device 306 for transferring its firmware update image 322, and activating the firmware update image 322 following transfer, some communication links as described above may possess a higher throughput rate. Currently available firmware update images 322 may be up to 40 Mega-bytes in size, and when transferred over an I2C communication link, for example, the firmware update image 322 could consume a relatively large amount of time given that I2C communication links often require approximately 53 minutes to transfer a 100 Kilo-byte image. Other firmware devices using the same I2C communication link could potentially be starved for tens of minutes. Nevertheless, vendors of the firmware devices 306 often continue to use I2C communication links for download and activation of firmware update images 322 for various reasons, such as a reluctance to change what has previously worked in the past. Thus, a relatively large firmware update image 322 that requires a reboot of the IHS 200 could cause significant downtime to its overall operation.

The RAC software agent 302 generally comprises a lightweight software service that is executed on the host IHS 200 to integrate certain operating system (OS) features with the RAC 230. The RAC software agent 302 provides OS-related information to the RAC 230, and may add capabilities such as LC log event replication into the OS log, WMI support (including storage), iDRAC SNMP alerts via OS, iDRAC hard reset and remote full Power Cycle. For example, the RAC software agent 302 may be an iDRAC Service Module (iSM) that is configured to operate with the integrated Dell remote access controller (iDRAC), which are both provided by DELL TECHNOLOGIES.

The IHS 200 may receive a firmware update image 322 that is to be installed on multiple firmware devices 306. The firmware update 322 typically includes multiple sub-images 324 that may each be associated with a particular component of the firmware device 306. Each firmware update image 322 often possesses several sub-images 324 that are configured for updating certain portions of the overall firmware used by the firmware device 306. A firmware update image 322 may, or may not include an updated version of each sub-image based upon whether it is needed or not. Reasons to update a version of a sub-image 324 may include, for example, to meet compliance policies, to take advantage of new features, enhancements to the IHS, deploy security fixes, and the like.

Certain sub-images 324 may be critical to the updating of the firmware device 306 in that when updated, there exists a relatively high likelihood that the HIS 200 will need to be rebooted to activate the firmware update image 322 on the firmware device 306. Within this disclosure, a critical sub-image 324 may include any component or portion of the firmware update image 322 that affects the core operation of the firmware update image 322 when installed on its respective firmware device 306. Taken another way, the sub-images 324 may be any component or portion of the firmware update image 322 that may have a relatively high likelihood of requiring a reboot of the IHS 200 if it is updated on the firmware device 306. Examples of such components may include portions that update the kernel in the firmware device 306, system libraries that are used by other components in the firmware device 306, bootstrapping firmware, and security stacks (e.g., OpenSSL, etc.) that maintain the integrity of the firmware device 306.

Embodiments of the present disclosure provide a solution to this problem, among others, by providing a rebootless firmware update system 300 that identifies the sub-images 324 in the firmware update image 322 that may be critical, and compares the versions of those sub-images 324 against the versions of the installed sub-components 326 of installed firmware 328 to determine if the critical sub-components 326 will be updated. If so, the rebootless firmware update system 300 may schedule a firmware update to be performed at a time in the future, such as at a time when the IHS 200 is incurring a minimal amount of processing load (e.g., during a maintenance window). In some embodiments, the rebootless firmware update system 300 may receive user input for providing manual selection of whether to continue to update the firmware device 306 immediately or schedule the firmware update for a later time.

In one embodiment, the rebootless firmware update system 300 may be implemented via an Original Equipment Manufacturer (OEM) command (e.g., directive or instruction) that when issued by the RAC 230, requests that the firmware device 306 respond with version information for each of its installed sub-components 326. For example, when the RAC 230 receives a firmware update image 322 that is directed to a particular firmware device 306, it may issue an OEM command 400 to that firmware device 306 to obtain information about the installed firmware sub-components 326 in the firmware device 306 so that a comparison may be made between the sub-images 324 and installed sub-components 326.

FIG. 4 illustrates an example of the various fields of an OEM command 400 that may be used to query the firmware device 306 for version information for each of its installed sub-components 326. For example, the fields may include multiple request fields 402 indicating what information is requested by the RAC 230, and multiple response fields 404 indicating how the requested information is to be included in a response OEM command 400. Variable component data fields 406 indicate how the information about the sub-images 324 is to be parsed within the command.

Figure 5:
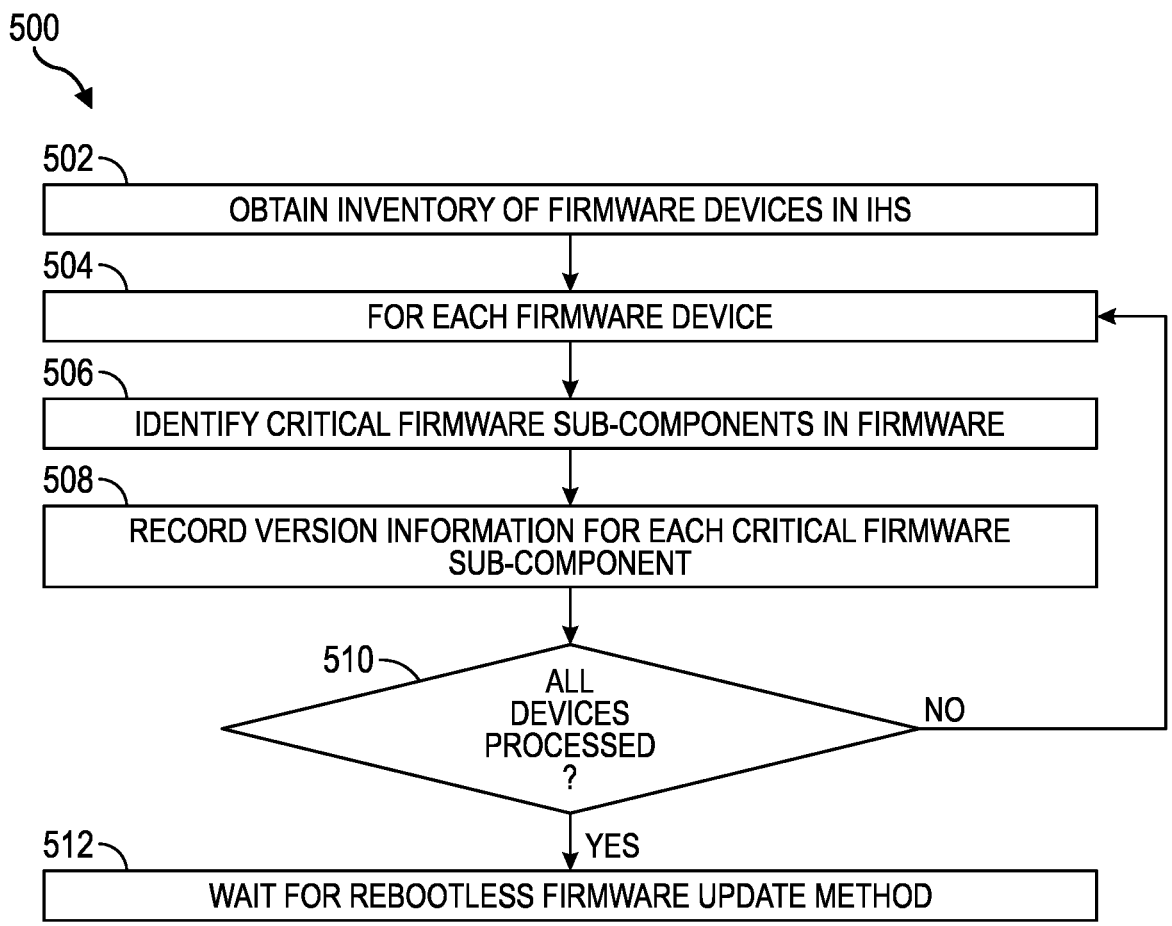
FIG. 5 illustrates an example sub-component version acquisition method that may be used to acquire versioning information for the sub-components of installed firmware in the firmware devices configured in an IHS according to one embodiment of the present disclosure.

FIG. 5 illustrates an example sub-component version acquisition method 500 that may be used to acquire versioning information for the sub-components 326 of installed firmware 328 in the firmware devices 306 configured in an IHS 200 according to one embodiment of the present disclosure. In one embodiment, the sub-component version acquisition method 500 may be performed in whole, or in part, by the RAC 230 as described herein above. In other embodiments, the sub-component version acquisition method 500 may be performed by any suitable component or combination of components configured in the IHS 200. In one embodiment, the sub-component version acquisition method 500 may be performed by a daemon that is executed as a background process to continually monitor for ongoing changes that may occur to the installed firmware 328 in each of the firmware devices 306.

At step 502, the method 500 obtains an inventory of some, most, or all firmware devices 306 configured in the IHS 200. For example, the method 500 may communicate with the BIOS 304 to obtain the inventory from its storage. At step 504, the method 500 performs steps 506-510 for each firmware device 306 identified at step 502. At step 506, identifies the critical sub-components 326 in the installed firmware 328 of the firmware device 306. For example, the method 500 may include logic that detects when a particular sub-component 326 is adapted to manipulate the kernel, system libraries, bootstrapping firmware, and/or any security stacks in the firmware device 306. The method 500 may then record version information for each identified critical sub-component 326 at step 508. For example, the method 500 may store information about each identified critical sub-component 326 in a memory of the RAC 230 and/or the IHS 200. In one embodiment, the method 500 may use an OEM command such as described above with reference to FIG. 4 to obtain such information from the firmware device 306.

At step 510, the method 500 determines whether all firmware devices 306 have been processed to obtain their sub-component 326 versioning information. If not, processing continues at step 504 to obtain versioning information for the sub-components 326 in another firmware device 306; otherwise, processing continues at step 512 in which the method 500 waits for a rebootless firmware update method 600 as described herein below. In other embodiments, the aforedescribed method 500 may be performed any time that the rebootless firmware update system desires information about versioning information associated with the sub-components 326 of each firmware device 306 in the IHS 200. For example, the method 500 may be performed each time the IHS 200 is rebooted, or each time a new firmware update image 322 is installed on one or more of the firmware devices 306 configured in the IHS 200. For another example, the method 500 may be performed prior to rebootless firmware update method 600 being performed as will be described in detail herein below. Nevertheless, when use of the sub-component version acquisition method 500 is no longer needed or desired, the process ends.

FIG. 6 illustrates an example rebootless firmware update method 600 depicting how a firmware device 306 configured in an IHS 200 may be updated according to one embodiment of the present disclosure. In one embodiment, the rebootless firmware update method 600 may be performed in whole, or in part, by the RAC 230 as described herein above. In other embodiments, the method 600 may be performed by any suitable component or combination of components that provide updates to the firmware device 306. Initially, a new firmware update image 322 (e.g., software package or an updated version of an existing software package) is promoted or made available by a provider of the software package and/or the firmware device 306 that the firmware update image 322 supports.

At step 602, the method 600 receives a firmware update image 322. For example, the method 600 may upload a firmware update image 322 into the RAC 230 so that the RAC 230 can administer the firmware update. At step 604, the method 600 validates the firmware update image 322. The RAC 230, for example, may perform one or more validation steps to ensure that the downloaded firmware update image 322 is the correct type for the firmware device 306 to be updated, and/or any licensing agreements associated with the firmware device 306 are adhered to.

The method 600 then determines whether the firmware update image 322 is validated at step 606. If not, the method 600 at step 608 cancels the firmware update and notifies the user (e.g., IT administrator) that the firmware update image 322 has been invalidated in which the method 600 ends. If, however, the firmware update image 322 is validated, processing continues at step 610 in which the method obtains version information associated with the sub-images 324 of the firmware update image 322. The firmware update image 322 may include a metadata portion that stores sub-image 324 version information for each of its constituent sub-images 324.

At step 612, the method 600 obtains version information from the sub-components 326 of firmware 328 installed on firmware device 306. In one embodiment, the version information may be obtained using the sub-component version acquisition method 500 as described above with reference to FIG. 5, using instructions, such as a daemon that runs as a background process to continually update version information for each of the firmware devices 306 in the IHS 200. In other embodiment, the method 600 may obtain the version information at any suitable time, such as while the rebootless firmware update method 600 is being performed.

At step 614, the method 600 compares the critical sub-images 324 in the firmware update image 322 with their corresponding installed sub-components 326 of the installed firmware 328. Thereafter at step 616, the method 600 determines whether any differences in the version exist between any critical sub-images 324 of the firmware update image 322 and their corresponding installed sub-components 326 of the installed firmware 328. As mentioned previously, a difference in versions between the critical sub-images 324 in the firmware update image 322 with their corresponding installed sub-components 326 of the installed firmware 328 may indicate that the IHS 200 possesses a relatively high likelihood of requiring a reboot. If no any differences in the version exist between any critical sub-images 324 of the firmware update image 322 and their corresponding installed sub-components 326 of the installed firmware 328, the firmware update of the firmware update image 322 may be scheduled at any suitable time (e.g., immediately) at step 618. If, however, version differences of any of the critical sub-components 326 relative to the sub-images 324 of the firmware update image 322 exist, processing continues at step 620 in which the firmware update is scheduled to be performed at a time in the future.

In one embodiment, the method 600 may display an alert message (e.g., a popup window) for the user indicating that the firmware update of the firmware update image 322 will likely require a system reboot. In another embodiment, the method 600 may receive user input for determining whether to go ahead and schedule the firmware update of the firmware update image 322 immediately, or for selecting a particular time in the future to perform the firmware update. In another embodiment, the method 600 may include logic to schedule the firmware update based upon a known future time when a processing load is estimated to be at a minimal level, such as during a maintenance window. In yet another embodiment, the method 600 may restrict the firmware update from being performed. For example, the method 600 may restrict the firmware update from being performed by obtaining a processing load currently being incurred by the IHS 200, and determining that the current processing load exceeds a specified threshold.

The aforedescribed method 600 may be performed each time a firmware update image 322 is to be updated on one or more firmware devices 306 on the IHS 200 or other firmware devices 306 configured in a different IHS 200. Nevertheless, when use of the rebootless firmware update method 600 is no longer needed or desired, the process ends.

Although FIGS. 5 and 6 describe example methods 500, 600 that may be performed to transfer firmware update images to firmware device(s) 306 in an IHS 200, the features of the disclosed processes may be embodied in other specific forms without deviating from the spirit and scope of the present disclosure. For example, certain steps of the disclosed methods 500, 600 may be performed sequentially, or alternatively, they may be performed concurrently. As another example, the methods 500, 600 may perform additional, fewer, or different operations than those operations as described in the present example.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS) comprising:
a firmware device that is configured to be updated with firmware on an ongoing basis;
at least one processor; and
a memory coupled to the at least one processor, the memory having program instructions stored thereon that, upon execution by the at least one processor, cause the IHS to:
receive a firmware update image associated with the firmware device, the firmware update image conforming to a Platform Level Data Model (PLDM) protocol that is configured to perform rebootless firmware updates, wherein the firmware update image comprises a plurality of sub-images and metadata for the plurality of sub-images;
send a query to the firmware device, wherein the query is configured to cause the firmware device to respond with sub-component data associated with a plurality of firmware sub-components stored in the firmware device;

receive the sub-component data from the firmware device, wherein the sub-component data comprises, for each firmware sub-component of the plurality of firmware sub-components stored in the firmware device:
- a sub-component functional identification that each sub-component is one of: a kernel, a system library, bootstrapping firmware, a security stack, or other component;
- a sub-component type indication that each firmware sub-component is one of: non-critical, critical, or unknown; and
- a sub-component version identification;

determine, based at least in part on: the metadata included in the firmware update image, the sub-component functional identification received from the firmware device for each sub-component stored in the firmware device, the sub-component type indication, and the sub-component version identification received from the firmware device for each sub-component stored in the firmware device, that the firmware update image possesses a critical sub-image portion by detection that at least one of the plurality of sub-images is configured to perform at least one manipulation of a kernel, a system library, bootstrapping firmware, or a security stack in the firmware device, and that the at least one of the plurality of sub-images is a different version than the firmware sub-component that the at least one of the plurality of sub-images corresponds to; and in response to a determination that the firmware update image possesses the critical sub-image portion, increase IHS workload availability, comprising: schedule a firmware update with the firmware update image to be performed on the firmware device at a future time when a future processing load is estimated to be at a minimal level.

2. The IHS of claim 1, wherein the instructions, upon execution, cause the IHS to schedule the firmware update by receiving user input to specify the future time for the firmware update.

3. The IHS of claim 1, wherein the instructions, upon execution, cause the IHS to schedule the firmware update to be performed for all devices supported by the firmware update image in an IHS cluster comprising a plurality of IHSs.

4. The IHS of claim 1, wherein the instructions, upon execution, cause the IHS to generate an alert message for a user indicating that the firmware update of the firmware update image will likely require a system reboot.

5. The IHS of claim 1, wherein the instructions, upon execution, cause the IHS to:
perform the firmware update at least in part via an integrated Dell Remote Access Controller (iDRAC).

6. The IHS of claim 5, wherein the instructions, upon execution, cause the IHS to
perform the firmware update out-of-band.

7. The IHS of claim 1, wherein the instructions, upon execution, cause the IHS to receive the sub-component data using an Original Equipment Manufacturer (OEM) command that is configured to be issued to the firmware device.

8. The IHS of claim 1, wherein the instructions, upon execution, cause the IHS to receive the sub-component data via a daemon process.

9. The IHS of claim 1, wherein the instructions are performed by a Remote Access Controller (RAC) configured in the IHS.

10. A rebootless firmware update method comprising:
receiving a firmware update image associated with a firmware device, the firmware update image conforming to a Platform Level Data Model (PLDM) protocol that is configured to perform rebootless firmware updates, wherein the firmware update image comprises a plurality of sub-images and metadata for the plurality of sub-images;

sending a query to the firmware device, wherein the query is configured to cause the firmware device to respond with sub-component data associated with a plurality of firmware sub-components stored in the firmware device;

receiving the sub-component data from the firmware device, wherein the sub-component data comprises, for each firmware sub-component of the plurality of firmware sub-components stored in the firmware device:
- a sub-component functional identification that each sub-component is one of: a kernel, a system library, bootstrapping firmware, a security stack, or other component; and
- a sub-component type indication that each firmware sub-component is one of: non-critical, critical, or unknown; and
- a sub-component version identification;

determining, based at least in part on: the metadata included in the firmware update image, the sub-component functional identification received from the firmware device for each sub-component stored in the firmware device, the sub-component type indication, and the sub-component version identification received from the firmware device for each sub-component stored in the firmware device, that the firmware update image possesses a critical sub-image portion by detecting that at least one of the plurality of sub-images is configured to perform at least one manipulation of a kernel, a system library, bootstrapping firmware, or a security stack in the firmware device, and that the at least one of the plurality of sub-images is a different version than the firmware sub-component that the at least one of the plurality of sub-images corresponds to; and in response to determining that the firmware update image possesses the critical sub-image portion, increasing IHS workload availability, comprising scheduling a firmware update with the firmware update image to be performed on the firmware device at a future time when a future processing load is estimated to be at a minimal level.

11. The rebootless firmware update method of claim 10, further comprising scheduling the firmware update by receiving user input to specify the future time for the firmware update.

12. The rebootless firmware update method of claim 10, further comprising generating an alert message for a user indicating that the firmware update of the firmware update image will likely require a system reboot.

13. The rebootless firmware update method of claim 10, further comprising receiving the sub-component data using an Original Equipment Manufacturer (OEM) command that is configured to be issued to the firmware device.

14. The rebootless firmware update method of claim 10, further comprising receiving the sub-component data using a daemon process.

15. A memory storage device having program instructions stored thereon that, upon execution by one or more processors of an Information Handling System (IHS), cause the IHS to:
- receive a firmware update image associated with a firmware device, the firmware update image conforming to a Platform Level Data Model (PLDM) protocol that is configured to perform rebootless firmware updates, wherein the firmware update image comprises a plurality of sub-images and metadata for the plurality of sub-images;
- send a query to the firmware device, wherein the query is configured to cause the firmware device to respond with sub-component data associated with a plurality of firmware sub-components stored in the firmware device;
- receive the sub-component data from the firmware device, wherein the sub-component data comprises, for each firmware sub-component of the plurality of firmware sub-components stored in the firmware device:
  - a sub-component functional identification that each sub-component is one of: a kernel, a system library, bootstrapping firmware, a security stack, or other component;
  - a sub-component type indication that each firmware sub-component is one of: non-critical, critical, or unknown; and
  - a sub-component version identification;
- determine, based at least in part on: the metadata included in the firmware update image, the sub-component functional identification received from the firmware device for each sub-component stored in the firmware device, the sub-component type indication, and the sub-component version identification received from the firmware device for each sub-component stored in the firmware device, that the firmware update image possesses a critical sub-image portion by detection that at least one of the plurality of sub-images is configured to perform at least one manipulation of a kernel, a system library, bootstrapping firmware, or a security stack in the firmware device, and that the at least one of the plurality of sub-images is a different version than the firmware sub-component that the at least one of the plurality of sub-images corresponds to; and
- in response to a determination that the firmware update image possesses the critical sub-image portion, increase IHS workload availability, comprising: schedule a firmware update with the firmware update image to be performed on the firmware device at a future time when a future processing load is estimated to be at a minimal level.

16. The memory storage device of claim 15, wherein the instructions, upon execution, cause the IHS to:
schedule the firmware update to be performed for all devices supported by the firmware update image in an IHS cluster comprising a plurality of IHSs.

17. The memory storage device of claim 16, wherein the instructions, upon execution, cause the IHS to perform the firmware update at least in part via an integrated Dell Remote Access Controller (iDRAC).

* * * * *